Aug. 18, 1964  J. K. STEWART  3,144,834
MEANS FOR DETERMINING ROADBED LEVEL AND SUPER ELEVATION
Filed June 30, 1961  7 Sheets-Sheet 1
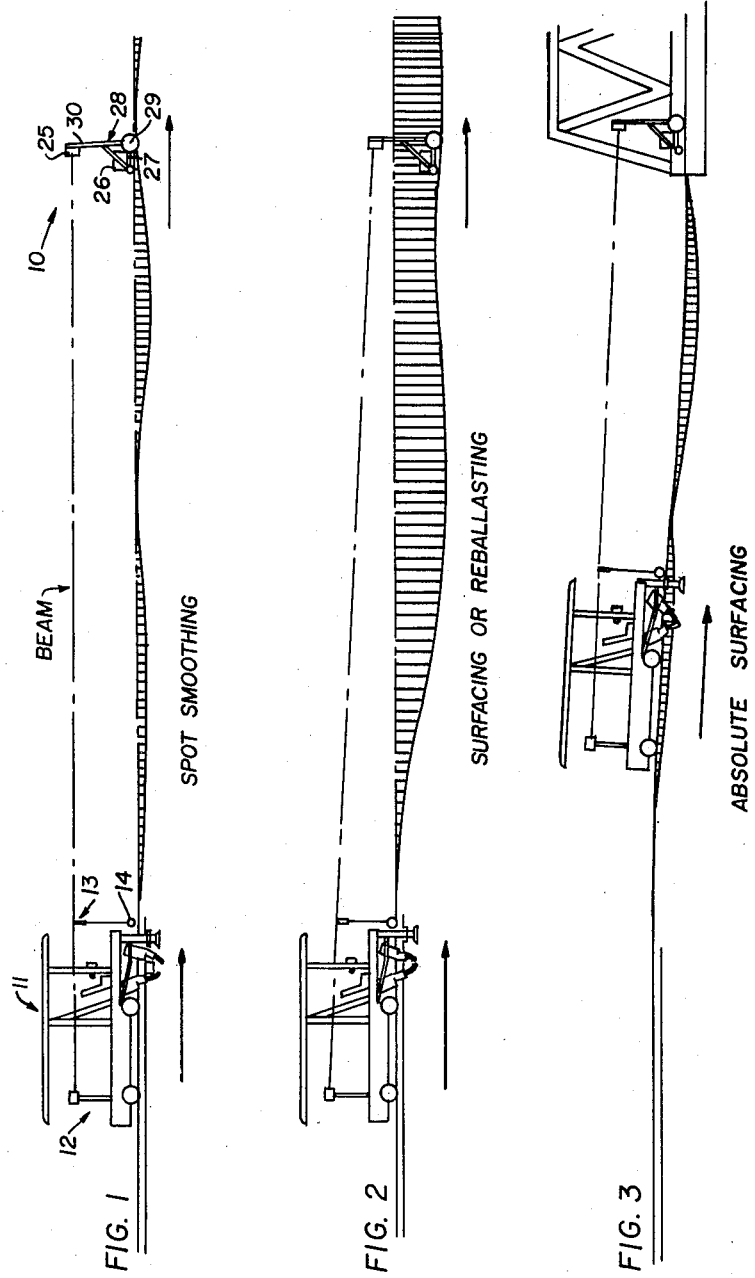
INVENTOR
JOHN K. STEWART
BY— *Smart & Biggar.*
ATTORNEYS

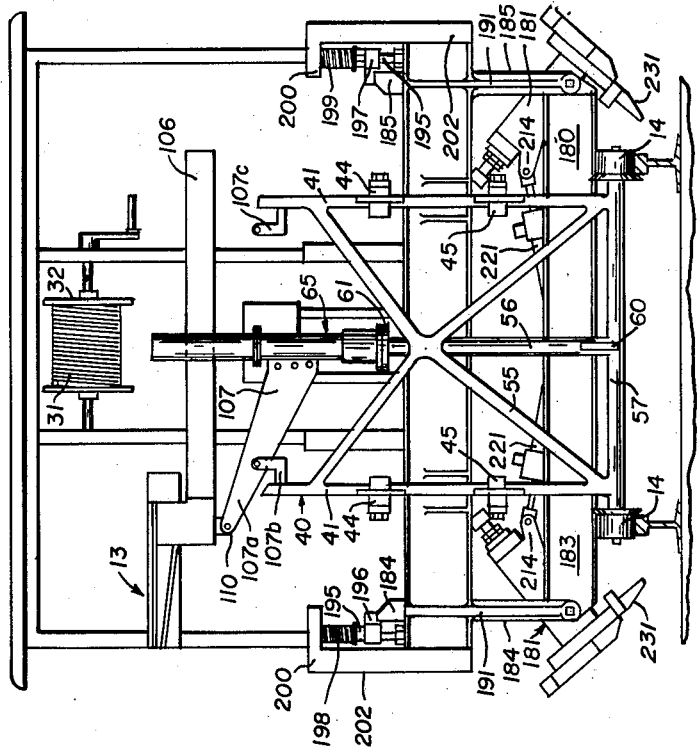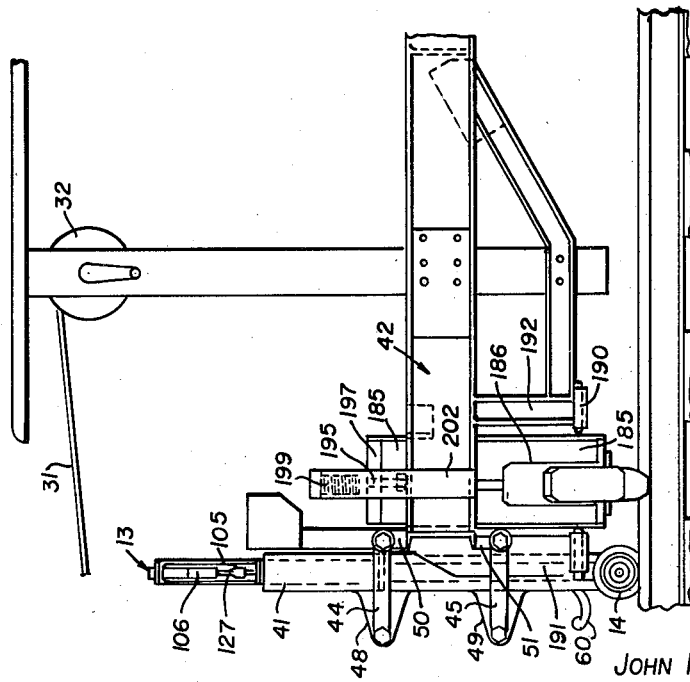

Aug. 18, 1964  J. K. STEWART  3,144,834
MEANS FOR DETERMINING ROADBED LEVEL AND SUPER ELEVATION
Filed June 30, 1961  7 Sheets-Sheet 3
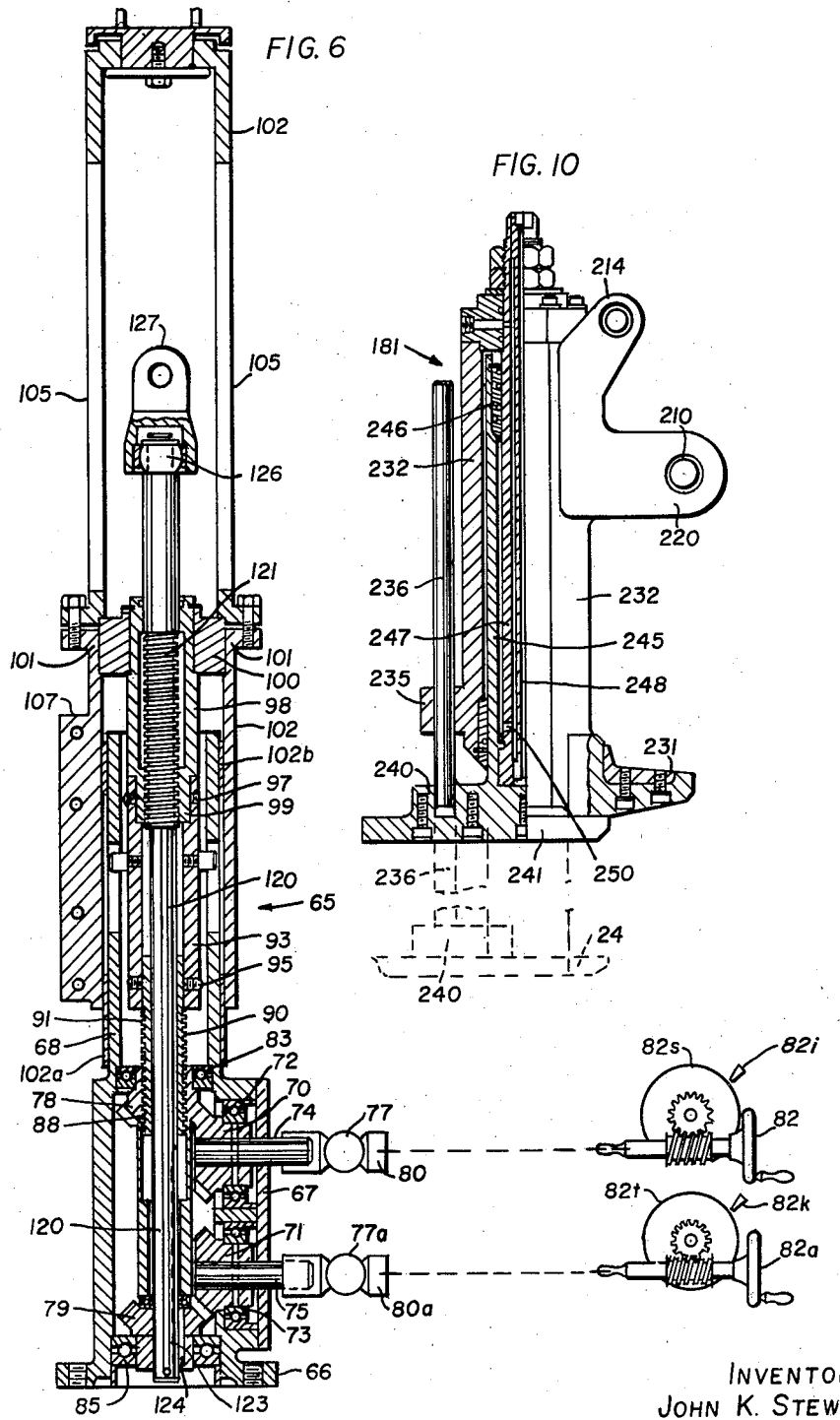
INVENTOR
JOHN K. STEWART
BY- *Smart & Biggar*
ATTORNEYS.

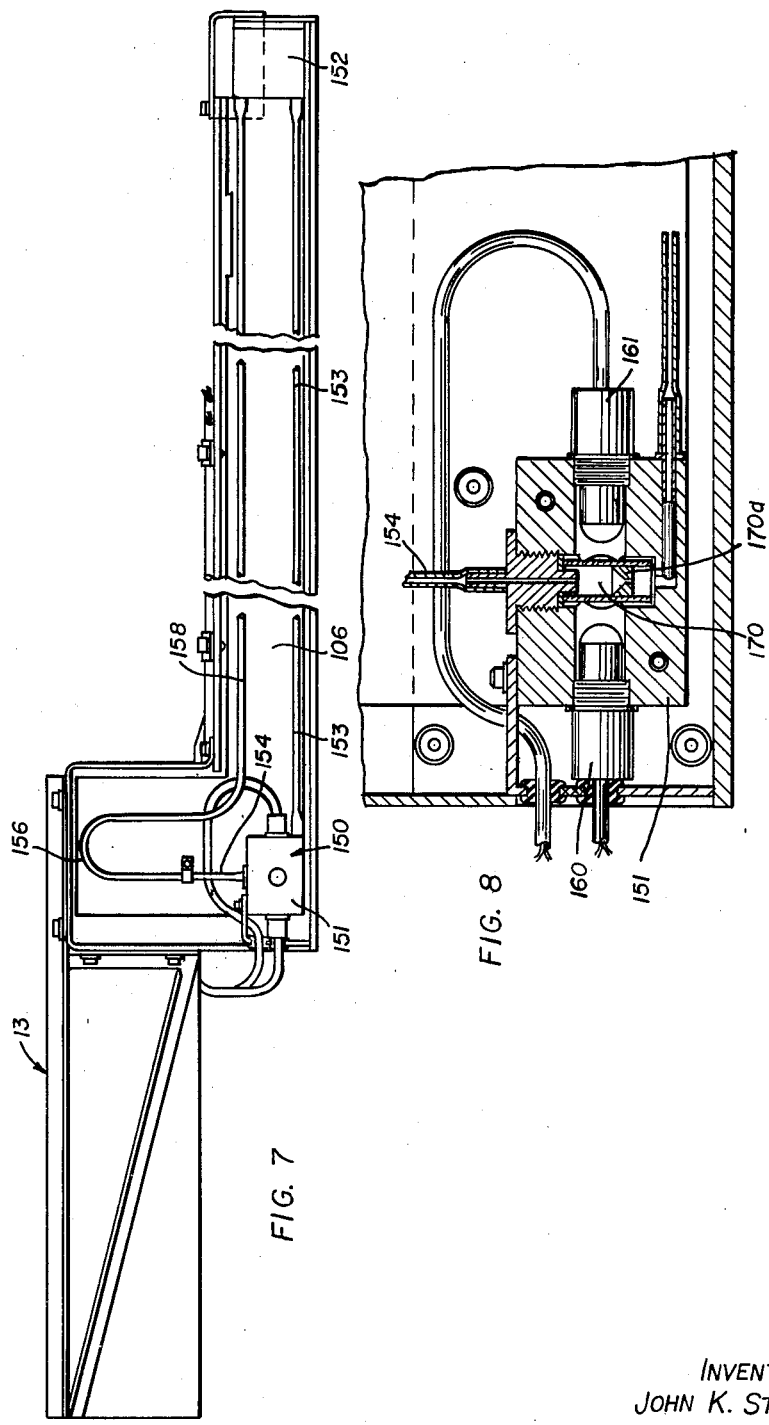

Aug. 18, 1964    J. K. STEWART    3,144,834
MEANS FOR DETERMINING ROADBED LEVEL AND SUPER ELEVATION
Filed June 30, 1961    7 Sheets-Sheet 6
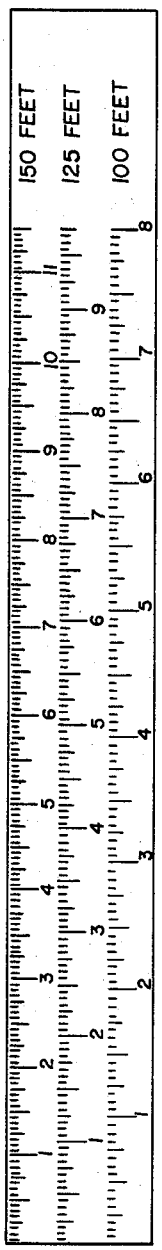
FIG. 11
LONGITUDINAL ADJUSTER SCALE
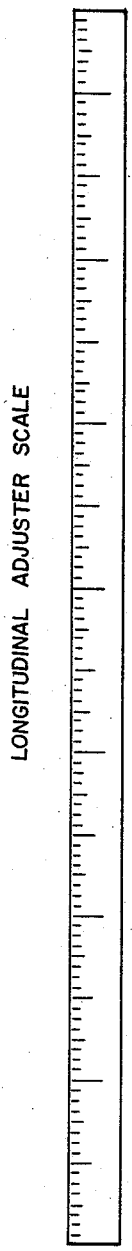
FIG. 12
CROSS LEVEL ADJUSTER SCALE
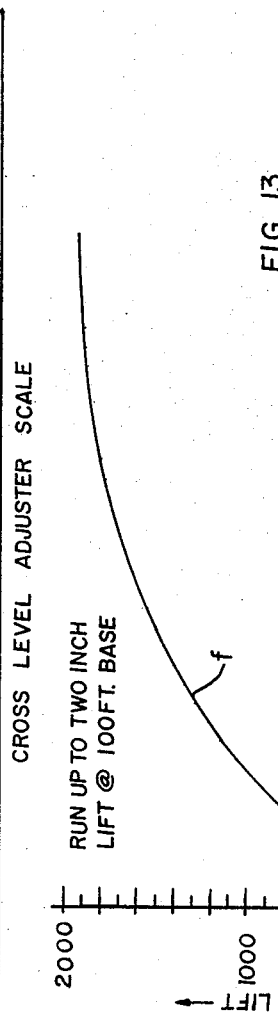
FIG. 13
RUN UP TO TWO INCH
LIFT @ 100 FT. BASE
INVENTOR
JOHN K. STEWART
BY— *Smart & Biggar*
ATTORNEYS.

INVENTOR
JOHN K. STEWART
BY— Smart & Biggar.
ATTORNEYS.

3,144,834
MEANS FOR DETERMINING ROADBED LEVEL
AND SUPER ELEVATION
John Kenneth Stewart, 60 Ballantyne Terrace, Dorval,
Quebec, Canada
Filed June 30, 1961, Ser. No. 121,075
10 Claims. (Cl. 104—12)

This invention relates to a roadbed, particularly railroad surveying device for indicating discrepancies in a railroad track profile or surface and, particularly, to surveying apparatus which may be used with railroad ballast tamping apparatus of the type having jack means for engaging the ballast to raise the rail.

It has been previously proposed to correct existing track for vertical height and for alignment by use of a wire extended between a pair of connected dolly cars in the manner of a builder's plumb line, an intermediate dolly being provided between the two aforementioned dollies and coupled thereto, said intermediate dolly being provided with an indicator arm which is raised and lowered on a screw thread drive by an operator until such arm comes into contact with the substantially taut wire.

This prior method suffers from any disadvantages, one very obvious one of which is the necessity to keep the wire as near as taut as possible at all times. Whilst on straight and relatively level track in calm weather this disadvantage is minimized to the necessity only to overcome the wire's natural tendency to sag, the task becomes extremely difficult where the device is used on a curved track or on track which starts into a hill or to level out of a hill.

A further major disadvantage of the prior art device is its inability to provide a reference line for a tamping device when the tamping device is used to adjust track in an approach to a bridge or the like. It is necessary, in order to accomplish this operation, to use the time tried method of visual sights on a fixed point adjacent the bridge and to work the track gradually to the level of that fixed point by a series of visual sights since it would not be possible, with the aforesaid prior art device, to stop one of the dollies at the bridge entrance and work down the wire.

The present invention has overcome these and other disadvantages of the prior art devices by providing apparatus for surveying a railroad track which comprises a high frequency beam transmitter (say, a high intensity light beam transmitter) adapted to be mounted on the railroad track, a beam receiver adapted to be mounted on the railroad track, sensing means including beam interference means adapted to be responsive to discrepancies in the railroad track surfaces, said beam interference means being located between said transmitter and said receiver, and means responsive to reception with the transmitted beam to indicate the condition of the railroad track surface.

Preferably, the transmitter should be located so as to transmit its beam adjacent and above the grade rail and cross-level sensing means should be provided to indicate a variation in the vertical plane position of the grade and other rail of the track.

The surveying device according to the present invention is especially suitable for use with the device as described in applicant's co-pending United States application 55,071 filed September 9, 1960, which has a tie sensor, a pair of tamping heads mounted on a rail carriage and located for individual operation one above each rail of the track and having fully automatic control means which cycle the tamping operation of lowering the heads into the ballast beneath a selected tie to a predetermined depth, or until they meet with a predetermined resistance, squeezing the ballast beneath the tie until a pressure switch is operated, retracting the tamping heads and initiating forward motion of the carriage along the track to the next tie or to the second next tie depending on the control selector.

On such a device, the present invention confers the ability to proceed at relatively high speeds along a track and in response to the signals originating from the light beam to cause the tamping heads to be operated to correct existing track or to build up the track to any preselected level and in addition to automatically provide the desired banking of the track. It is necessary only to provide the device as described in my aforementioned copending patent application with jack means capable of engaging the ballast and raising the rails, in addition to the surveying apparatus of the present invention in order to provide for fully automatic maintenance or resurfacing of track.

The following is a description by way of example of an embodiment of the invention, reference being had to the accompanying drawings in which:—

FIGURES 1, 2 and 3 schematically show the device according to the present invention in association with a tamping machine, the situation as depicted being the operation;
In FIGURE 1 of spot smoothing;
In FIGURE 2, of surfacing or reballasting; and
In FIGURE 3, of an absolute surfacing;

FIGURES 4 and 5 are front and side views of the sensing element of the invention as it may be mounted on an extension frame on a tamping machine;

FIGURE 6 is a cross section through the mounting means for the shadow beam;

FIGURES 7 and 8 are details of a cross-level device for the shadow beam;

FIGURE 10 is a detail of one of the jacks for engaging the ballast beneath the rail and lifting the rail;

FIGURES 11 and 12 are details of the scales to which an operator may work in order to simplify his work;

FIGURE 13 is a graphical representation greatly exaggerated, of the profile of a 2 inch lift accomplished on an infinite base.

Figure 9:
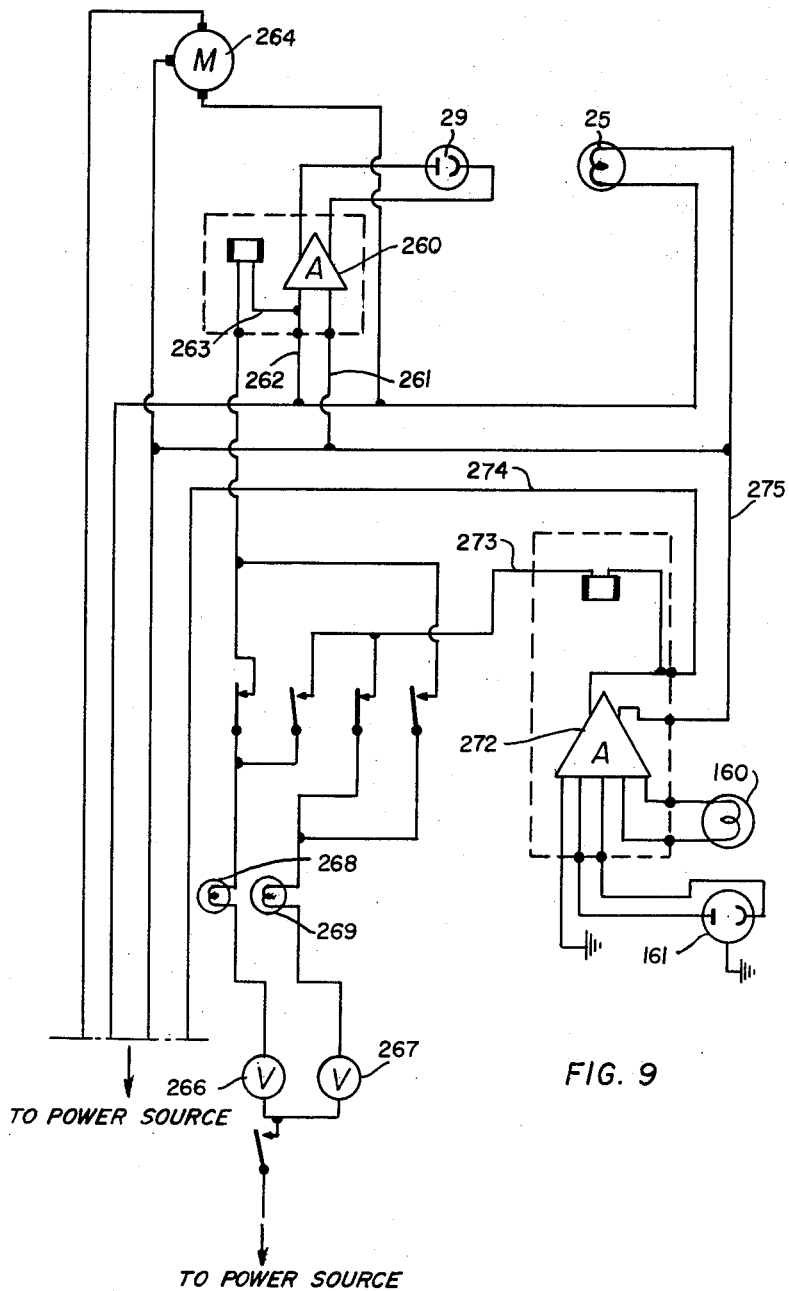
FIGURE 9 is a schematic diagram of the electric circuit.

Referring now to the drawings, there is shown digrammatically in FIGURE 1 a light beam transmitting device 10, a tamping machine 11 having a light beam receiving device 12 mounted thereon and carrying at the front thereof a track condition sensor including a shadow board 13. The track condition sensor is mounted on wheels 14 on the track independently of the tamping machine 11 but is connected to the tamping machine. The tamping machine may suitably be a tamping device as described in my aforementioned copending United States patent application Serial No. 55,071 modified to include rail lifting jack means. Of course the tamping device could be any tamping jack but in view of the automaticity of my aforementioned device, additional benefits accrue from using the device of the present invention therewith over the benefits obtained from using the device of the present invention with a standard tamping jack. Such benefits will become apparent hereafter.

The beam transmitting device 10 of this embodiment comprises an electric light projector 25 mounted on a base frame 27 of a buggy 28 having rail engaging wheels 29. The projector 25 is arranged on an upstanding frame 30 and projects its light beam through some form of known frequency fixing means, for example a motor driven disc having a plurality of slots therein which will project the light beam at, say, 400 cycles per second.

The projector 25 has an infra-red filter through which it projects its light. The electrical energy for the projector is obtained from a generator on the machine 11 and carried by cable 31 to the buggy 28. The projected light is at a relatively high level of intensity to avoid interference by extraneous light sources or reflections. The horizontal spread of the light from the projector should be sufficient to enable the receiver 12 to pick up the transmitted light whilst the buggy 28 is negotiating a curve on the track ahead of the tamping device.

The buggy 28 may be driven by an electrical high-torque motor thereon and through gear reductions and a chain drive to the axle of the wheels 29. The electric motor also obtains its energy from the generator on the tamping machine 11, through the electrical cable 31 (see FIGURES 4 and 5) spanning the distance between tamping machine and buggy. The cable 31 is mounted on a reel 32 and acts to restrain the buggy's movement relative to machine 11. When buggy 28 is not in use, the drive to the wheels 29 can be disconnected and it can be coupled to the tamping machine 11 for track transportation.

Alternatively, the buggy 28 may be a self-contained unit having a gasoline motor thereon to drive a hydraulic pump and a generator. The hydraulic pump may be coupled to a hydraulic motor coupled to the wheels 29 and a radio receiving device on the buggy 28 may control its movements in response to command signals originating from a transmitter under the hand of the operator on the tamping machine 11.

The light receiver 12 comprises a photo-electric cell 29 (FIGURE 9) electrically connected to a tuned amplifier 260 which is responsive only to the light frequency of the transmitter, in this instance, 400 cycles per second. The receiver should be provided with some means such as an optical system, in cooperation with an infra-red filter, such that sufficient light intensity to operate the cell will be received within the limitations of practical curvature of a normal railroad track. Such an optical system could include a Fresnel lens or a shaped mirror. Additionally, or alternatively, the photo-electric cell may be in strip form arranged to receive the transmitter light when transmitter and receiver are out of alignment with each other, for example on a curve. The amplifier may be electrically connected to a signal light 268 (FIGURE 9) on an operator's panel on the tamping machine 11 so that the operator may receive a visual indication that the transmitted beam is being received by the receiver or if the device of the present invention is used with the tamping machine as described in my aforementioned patent application Serial No. 55,071, the amplifier may additionally be arranged to transmit a command signal to stop the tamping machine 11 and to initiate an automatic tamping cycle therefor.

Two receivers 12 and two transmitting light sources 25 may be provided one above either rail of the track so that when entering an S-curve, where the grade rail changes, the transmitters and, where necessary, also the receivers, can be switched over or, alternatively, a single transmitter 25 and a single receiver 12 may be provided on means capable of transporting them on their respective mounts transversely of the track to a stop position above either rail.

Turning now to FIGURES 4 and 5 which illustrate the tamping machine carrying the shadow board 13 on an upstanding frame 40. The frame 40 comprises a pair of side arms 41 coupled to an extension frame 42 of the tamping device through swinging links 44, 45 pivoted to lugs 48, 49 on the upstanding frame and to lugs 50, 51 on the extension frame 42 of the tamping machine. The upstanding frame is strengthened by a substantially X-shaped frame 55 and a central upstanding post 56 is provided, secured at one end to the axle 57 which carries the rail engaging wheels 14 and to the X-frame 55 at its point of intersection. The post 56 carries a hook attachment lug 60 which is adapted to be connected to the buggy 30 when the buggy is not in use so that the buggy may be transported along the track by being pushed or pulled by the tamping machine 11.

On the upstanding post 56 there is provided a boss 61 carrying a screw jack assembly generally indicated at 65.

Turning now to FIGURE 6 which shows in detail the screw jack assembly 65. A circular flange 66 is located at one end of the assembly and enables it to be bolted to the boss 61 on the post 56. Upstanding from the flange 66 is a gear box 67 with a cylindrical extension 68. The gear box 67 houses a pair of cone gears 70, 71 located one above the other in bearings 72, 73. The cone gears 70 and 71 are driven by shafts 74, 75 through universal joints 77, 77a, which through flexible shafts 80, 80a are connected through gearing with control wheels 82, 82a on an operator's panel on the tamping machine 11. The cone gears 70 and 71 mate with cone gears 78, 79 mounted in bearings 83, 85.

Scale wheels 82s and 82t are driven by the wheels 82 and 82a respectively so that the amount of movement imparted by the wheels 82, 82a may be measured. Scale wheel 82s carries the scales illustrated in FIGURE 11 on its periphery, whilst scale wheel 82t carries the scale shown in FIGURE 12.

When the operator turns the wheel 82 to actuate the flexible drive 80 the drive shaft 74 is rotated and with it the conical gear 70. The conical gear 70 mating with the gear 78 drives it. Internal threads 88 extending axially of the gear wheel 78 engage the external threads 90 on a hollow shaft 91 and move it upwardly or downwardly, depending on the sense of rotation of the wheel 82, relative to the gear 78 which is incapable of axial movement due to its bearings 83. The hollow shaft 91 is fixed to the sleeve 93 by means of studs 95 and thus the axial movement of the shaft 91 is transmitted directly to the sleeve 93 and it is caused to move therewith. The sleeve 93 it attached through set screws 97 to the hollow cylindrical extension member 98 having an internally threaded axial portion 99. The member 98 abuts against and is attached to the collar 100 which is housed in a recess 101 in the split outer cylinder 102 in such a manner that the cylinder 102 is pivotally supported by the collar 100. The outer cylinder 102 is accordingly moved with the shaft 71, the sleeve 93, the extension member 98 and the collar 100 when the shaft 74 is rotated, the cylinder 102 sliding in bronze bushings 102a, 102b relative to the cylindrical extension 68.

The outer cylinder 102 has a pair of transversely aligned slots 105 cut therein to pass the supporting cross frame 106 (see FIGURE 5) for the shadow board. The anchor bracket 107 for the shadow board is welded to the outside of the split outer cylinder 102.

When the operator rotates the wheel 82a to drive the shaft 75 through the flexible shaft 80a the gear wheel 71 is rotated. This gear wheel meshes with its mating conical gear 79 and rotates the central shaft 120 through the cooperating key 123 and keyway 124. The shaft 120 has a threaded portion 121 engaging the internal threads in the threaded portion 99 of the extension member 98. Rotation of the shaft 120 thus causes it to move up or down, depending on the sense of rotation of the drive wheel 82a, in the member 98, that is, relative to the split outer cylinder 102. At the upper end of the shaft 120 is a universal joint 126. The universal joint connects the shaft 120 with a clevis 127 which receives the cross member 106 (FIGURE 7) carrying the shadow board 13.

Thus, the rotation of the shaft 75 causes the gear 71 to lift and lower the cross member 106 and consequently the shadow board is moved vertically. This is, of course, also true when the gear 70 is operated since the extension members 98 will lift the shaft 120 through their mating threads. However, when the shaft 75 is actuated the shaft 120 moves relative to the outer cylinder 102 and not with it, with the result that the clevis 127 moves the cross member 106 of the shadow board up relative to the anchor bracket 107. Since the member 106 is pivoted at 110 (FIGURE 5) to the arm 107a of the bracket 107, which, in its turn, is attached to the cylinder 102, the shadow board is tilted about its pivot point 110 and its cross member 106 tilts up and down within the slots 105 about the universal joint 126.

In order to swing the shadow board 13 (as would be required, for example, in a curve) when the grade rail changes it is merely necessary to release the spring urged retaining clip 107b on the side arm 41 and swing the shadow board 13 and with it the split outer cylinder 102 on the collar 100 until the arm 107a is in position to be engaged by the spring urged retaining clip 107c on the other side arm. The shadow board is then in position to interfere with the light beam for the new grade rail. Switch means (not shown) are operated by the swinging of the shadow board to switch on the appropriate combination of transmitters and receivers for the new position. These switch means are, of course, only included when two transmitters and two receivers are provided.

Extending across the back of the shadow board and its cross member 106 is a cross level indicator 150 (FIGURES 7 and 8) having a switch 151 at one end of the cross member 106. At the other end of the cross member 106 there is provided a reservoir of mercury 152. The reservoir is connected to the switch 151 by a lower tube 153 which is filled with mercury and by a top venting tube 154 which extends upwardly from the switch 151, bends at 156 and returns on a straight path at 158 to the reservoir 152.

In FIGURE 8 it will be observed that the switch comprises a light source 160 (see also FIGURE 9), a photoelectric cell receiver 161, the light passing through a central bore 170 which is fed with mercury on the underside from the tube 153 and is exhausted from the top by the tube 154.

It will be clear when the clevis 127 and cross member 106 of the shadow board are moved relative to the cylinder 102 and the shadow board tilts about its pivot point 110 the tubes 153 and 158 are tilted with the cross member 106 and thus the central bore 170 is fed with more mercury than it normally holds when the cross member 106 is in transverse level position, or the mercury runs out of the bore 170 to the reservoir 152, depending upon the sense of tilt. By filling the bore 170 with mercury, light transmission from the light source 160 is cut off from the photoelectric cell 161. In this manner, the switch 151 is operated to give an indication that the shadow board is not in horizontal transverse alignment. In order to obtain a sharp response a steel float 170a is provided on top of the mercury.

Turning now to FIGURES 4, 5 and 10. Mounted within the extension frame 42 is a U-shaped (when viewed from the front) floating frame 180 which carries the rail and ballast engaging clamp and jack member 181. The web of the frame 180 comprises a pair of transversely extending back-to-back spaced channel sections, the front one of which is indicated in FIGURE 5 as 183. These sections are joined by a pair of upstanding side members 184, 185 forming the flanges of the U each of which is slotted at 186 to pass the jack 181. The floating frame 180 is mounted in the extension 42 between four spring urged plungers 190 on front and rear pairs of support arms 191, 192 and is vertically sustained by a pair of rods 195 which are spring urged down onto the outwardly projecting flanges 196, 197 on the tops of the side members 184, 185 by springs 198, 199. The springs contact the underside of a pair of hook members 200 on uprights 202 rigidly attached to the frame 42.

In FIGURE 10, a detail of one of the rail gripping and lifting members 181 is shown. There are two such members mounted one over each rail between the spaced channel sections 183 and connected thereto by pivot pins engaging in the bearings 210 in the lugs 220. A pair of double acting hydraulic piston and cylinder assemblies 221 (FIGURE 5) are connected by pivots on their cylinders to the channel sections 183 and by clevises at the outer ends of their piston rods to the tilting lugs 214 of the members 181. Each lifting member 181 and its associated assembly 221 may be arranged for independent or combined actuation. Actuation of one of the cylinders 221 causes its associated member 181 to tilt about its pivot pin at 210. When it is desired to lift the track, pressure is supplied to both cylinders 221 which rock the members 181 outwardly and downwardly so that their toes 231 engage beneath the rails from the outside. The fact that the members 181 are mounted in the floating frame 180 enables the correct level to be obtained since the frame 180 will yield and compensate for discrepancies in the track, the toes 231 then firmly engaging the underside of the rail.

Each member 181 has a cylindrical external wall 232 to which the toe 231 is fixed and on which a guide 235 is located which passes a centering rod 236. The rod 236 is arranged to slide in the guide 235 and is connected at its outer extremity to a base plate 240 of a ballast engaging shoe 241. The base plate 240 is connected to a hollow cylindrical piston rod 245 having an internal return piston 246 which slides on a central guide 247 within the cylinder. When hydraulic pressure is applied to the central bore 248, the shoe 241 is caused to move outwardly of the cylinder taking therewith the cylindrical piston rod 245 and return piston 246. This action drives the shoe 241 into the ballast beneath the rail. The toes 231 of the two members 181 thus lift the track and with it the extension frame and the shadow board.

Application of hydraulic pressure through port 250 returns the piston 246 and thus the shoe 241.

As an alternative to the cross level sensing device outlined above, a gravity sensing electrolytic potentiometer consisting of a common electrode and two operational electrodes sealed in a small glass vial may be provided. In such a device, the resistances between the operational and common electrodes would vary with the angle of tilt.

This sensing device would be connected in a bridge circuit and energized with alternating current. The bridge output would be phased with a constant A.C. voltage. A reference D.C. voltage would be used in conjunction with the bridge output. The resultant output would be amplified and rectified such that a relay would be energized when the sensing device is tilted in one direction only. When the sensing device is level or tilted in the opposite direction the relay contacts would open.

Referring to FIGURE 9 which shows schematically a preferred electric switching arrangement operated by the projector 25 and the receiver 12 and by the cross levelling projector 160 and photoelectric cell receiver 161 as illustrated in FIGURES 7 and 8. The switching arrangement shown in FIGURE 9 is one which can readily be used with a tamping machine such as described in my co-pending application Serial No. 55,071, which provides for a sequential operation, in response to an electrical command signal, of stopping the machine above the tie to be tamped, of lowering the tamping heads into the ballast, of squeezing the ballast beneath the tie to the required pressure, of retracting the tamping heads from the ballast and of starting the machine down the track to the next tie to be tamped.

As has been hereinbefore described, it is desirable with the surveying device of the present invention to provide automatically operated lifting jacks for the rails of the track. Accordingly, the schematic diagram of FIGURE 9 shows additionally how these jacks may be operated.

When the light beam from the projector 25 is received by the photoelectric cell receiver 29 it caused the amplifier 260 to transmit on lines 261, 262, 263 a command signal in the form of an electrical impulse to cause the positioning of the machine and the operation of the tamping heads. Simultaneously, an impulse is transmitted through lines 263 to operate the relays 266, 267 to initiate the operation of both cylinders 221 to cause the jacks 181 to engage beneath the rails and to extend their shoes 241 into the ballast and to apply hydraulic power to the jack under the grade rail to lift it and with it the shadow board. In this fashion, the shadow board is put off cross-level. Thus, the mercury moves in its tilted tube and the receiver 161 ceases to receive a signal from the transmitter 160 and the amplifier 272 sends a command signal to apply hydraulic power to raise the other rail until cross-level is again achieved. This following cross-level correcting action is almost instantaneous. When the projected light beam is cut off, by interference by the elevated shadow board 13, from the receiver 12, the amplifier 260 no longer transmits the impulse and since the cross-level has been corrected the amplifier 272 also ceases to transmit and the shoes 241 retract from the ballast and the cylinders 221 pivot the jacks 181 out of contact with the ballast and up into the frame 180 for transportation. A pressure switch, not shown, (associated with the tamping head), ensures that, when the tamping heads have tamped to a predetermined degree of pressure they are returned and trip a switch, not shown, to send a signal to operate the motor 264, and thus the tamping device 11 is moved forwardly along the track.

Similarly, the cross level indicator transmitter 160 and receiver 161 may actuate on their own, if cross-level is off, or if superelevation is required, and through the amplifier 272 transmit command signals on lines 273, 274 and 275 to actuate one of the jacks 181 to impart the required lift to the desired rail. The operation is similar to that described is the preceding paragraph.

Where a gravity sensing electrolytic potentiometer is used in place of the cross-level indicator illustrated in FIGURES 7 and 8, the relay contacts would be connected in such a manner as to operate the lifting jack.

It will be understood that where a less sophisticated arrangement is desired, the command signals from amplifiers 260, 272 need merely light a lamp such as 268 and/or 269 on an operator's panel to give an indication that the state of the track is not as desired. This would be the case if, for example, the device of the present invention were used with a conventional jack tamper. Under these circumstances it would be expected that the operator would need to back up the jack tamper a few ties after his panel lamp or lamps gave indication for the need to jack and tamp owing to the absence in this arrangement of an automatic braking system.

In operation:

In FIGURE 1 the device is arranged for spot smoothing of the track. The transmitter 25 is moved away from the tamping machine 11 and, due to its high-torque motor, constantly leads the machine and is restrained by the electrical cable 31. The transmitter 25 leads the device 11 by distances of, say, 100, 125, or 150 feet. Where the buggy 28 is radio-controlled it can be caused to lead the tamping device 11 by a greater distance, say, 1000 feet. The buggy runs ahead on uncorrected track and the tamping device follows it. When the tamping machine reaches a discrepancy in the track surface, say, a low joint or a sag in the rail, the shadow board 13 on the wheels 14, which leads it, drops to a lower level than the transmitter 25 and thus the receiver 12 receives the signal. This signal, through amplifier 260, causes the motor 264 to be stopped, the rails to be jacked up and every tie of the track to be tamped to grade and cross-level indicated by the beams. If the tamping device 11 is of the kind shown in my copending application No. 55,071, the machine will continue to proceed along the track and to tamp every tie necessary until the shadow board indicates that the track error has been corrected. Where the tamping device is other than described in my copending application No. 55,071 and is merely a tamping jack, the operator of the tamping jack will continue to tamp each tie until the light on his panel indicating that the receiver 12 is receiving the beam from the transmitter 25 ceases to indicate, that is, when the discrepancy in the track has been corrected.

In FIGURE 2 there is illustrated the operation to be followed where surfacing or reballasting is required. Reference is also made to FIGURES 6, 11, 13 and 14. Let it be assumed that the device of the present invention is associated with the tamping machine as described in my copending application Serial No. 55,071 provided with the aforementioned jack means and that the desired lift is one of 2 inches on an infinite base.

If the transmitter 25 is sent ahead down the track to a distance of 100 feet then the 100 feet scale (FIGURE 11) on the scale wheel 82S is selected. The fact that the transmitter is at a much greater distance from the receiver 12 than is the shadow board 13, enables the practical assumption to be made that the transmitter 25 is on level track. This, of course, is in accordance with the well accepted practice of railroad surveying. The operator winds the wheel 82 till the scale wheel 82S shows a desired lift of 2 inches against the index 82$i$ (FIGURE 6). Effectively, the shadow board is only lowered a fraction of this two inches, in this instance, approximately ¼ inch. This is in accordance with scale derived from the mechanical limitations imposed by the structural ratios of the shadow board lifting mechanism and by the geometrical association of transmitter, receiver, and shadow board. No light will be received by the receiver and the jacking and tamping will commence. It will be observed from FIGURE 13 that the actual curve $f$ approximates to an exponential curve. In fact, the precise 2″ lift is never reached but can be brought as close to it as can be practically measured.

Figure 14:
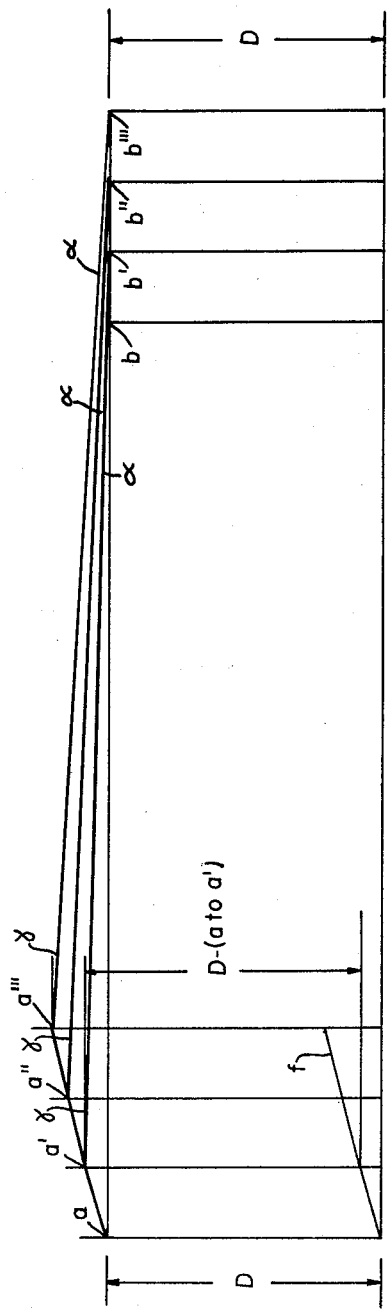
FIGURE 14 is a diagrammatic representation of the nature of the lifting operation.

Reference to FIGURE 14 shows graphically how the curve $f$ is formed.

The distance D represents the height of the transmitter, receiver, and shadow board at zero setting, above the tracks. When the shadow board is at point $a$, the tamping machine is on unraised track to the left of point $a$ as viewed in FIGURE 14 and the transmitter is at point $b$. As the lift commences the transmitter moves to point $b'$ and the shadow board cuts the light beam at point $a'$. The vertical distance between $a$—$a'$ is the setting, namely, approximately ¼″ of shadow board. The tamping machine is now on raised track. When the transmitter moves to point $b''$, the shadow board cuts the beam at point $a''$. The vertical distance between points $a'$—$a''$ is the distance setting of shadow board (¼″) less the the increasing factor "$\gamma$" caused by the increasing angle "$\alpha$" of the height of the board above the transmitter due to the climbing of the tamping machine and shadow board up the raised track. The transmitter moves to point $b'''$ etc., and the shadow board cuts the beam at point $a''''$ etc., and the curve $f$ is being formed since the tamping machine is climbing on raised track. The tamping machine maintains the lift once the setting is reached.

As different bases (say 125 feet, 150 feet) are used so different scales are required since the geometrical relationship of transmitter, receiver, and shadow board change to enable an operator to ensure the required lift is obtained merely by a single adjustment of the handle 82 and, to this end, an assortment of these scales are provided side by side on the scale wheel 82S.

Where the device is other than the automatic machine described in my aforementioned copending application and the scales are not provided the operator sets the desired lift on the shadow board in increments of his own choosing to achieve the desired rate of lift.

When it is desired to run out of a lift the shadow board is adjusted so that a "zero" reading is obtained on the scale wheel 82S and an automatic run out is thus accomplished.

When operating for spot smoothing as illustrated in FIGURE 1 or surfacing and reballasting as indicated in FIGURE 2 the projector 25 can be stopped at will at a bridge or level-crossing and a perfect runout down the beam to the bridge or other point is obtained as illustrated in FIGURE 3 with shadow board of zero setting.

When banking is desired, the operator actuates the handle 82a to tilt the shadow board about its pivot point 110 until the desired degree of superelevation is indicated on the linear scale (FIGURE 12) on the scale wheel 82t against the index 82k. This scale is advantageously calibrated to read in inches of vertical distances between the rails. This tilting causes the light from the source 160 to be interrupted from the photoelectric cell 161 (where the cross levelling arrangement is as illustrated in FIGURES 7 and 8) by the introduction of mercury into the space 170. The desired degree of superelevation is thus obtained.

Where the jacking device is not an automatic tamping device as described in my aforementioned copending application, interruption of the light from the source 160 will cause the amplifier 272 to operate a light 267 on the operator's panel so that he will jack and tamp the rail to obtain the desired degree of banking.

What I claim, as my invention is:

1. Apparatus for surveying a railroad track comprising a high frequency beam transmitter adapted to be mounted on rail engaging wheels and to transmit a high frequency beam adjacent and above the track grade rail; a receiver connected to a carriage having rail engaging wheels and to receive said high frequency beam; sensing means including a frame mounted on rail engaging wheels and a shadow board independently vertically adjustable, said sensing means being connected to said carriage and located adjacent said receiver between said transmitter and said receiver; means on said carriage responsive to beam reception to indicate a deviation in the vertical plane of the grade rail from a desired position; and cross level sensing means on the first mentioned sensing means to indicate a variation in the relative height of the grade to the other rail of the track.

2. Apparatus for surveying a railroad track comprising a fixed frequency high intensity infra-red light beam transmitter adapted to be mounted on rail engaging wheels and to transmit a fixed frequency high intensity infra-red light beam adjacent and above the track grade rail; a receiver mounted on a carriage having rail engaging wheels and to receive said beam; sensing means including a frame mounted on rail engaging wheels and a shadow board independently vertically adjustable, said sensing means being connected to said carriage and located adjacent said receiver between said transmitter and said receiver; means on said carriage responsive to beam interference by the shadow board to indicate a deviation in the horizontal plane of the grade rail from a desired position; and cross level sensing means on said first mentioned sensing means to indicate a variation in the horizontal plane positions of the grade and the other rail of the track.

3. For use with railroad ballast tamping apparatus of the type having independently operable tamping heads mounted over each rail of the track for movement along the track on a carriage and jack means for engagement with the ballast to raise the track; surveying apparatus comprising a fixed frequency high intensity infra-red light beam transmitter mounted on a wheeled chassis for movement on the railroad track independently of the ballast tamping apparatus and adapted to transmit a fixed frequency high intensity infra-red light beam adjacent and above the track grade rail; a beam receiver mounted on the carriage for movement therewith; sensing means including a frame having rail engaging wheels and an adjustable shadow board, said sensing means being connected to said carriage for movement therewith and located adjacent the receiver between said transmitter and said receiver; remote control means operable from said carriage to adjust the vertical height of the shadow board relative to its rail engaging wheels; means on said carriage responsive to beam reception by said receiver to transmit a command signal to said ballast tamping apparatus to stop its forward motion, jack and tamp the track until the shadow board on the track is lifted to interfere with the transmitted beam, and cross level sensing means on said shadow board sensitive to variations in the horizontal plane position of the other rail from the grade rail adapted to transmit a signal to cause said tamping apparatus to jack and tamp the other rail until a predetermined relationship is established between said other rail and said grade rail.

4. Apparatus as claimed in claim 3 in which the chassis is propelled by an electric high-torque motor which obtains its power from a cable connected to a generator on the carriage, said cable acting to limit the distance which the chassis may move away from the carriage.

5. For use with a railroad ballast tamping apparatus of the type having independently operable tamping heads mounted on a carriage over each rail for movement along the railroad track, an extension on said carriage adjacent said tamping heads, jack means on said extension, control means, adapted on operation, to actuate said jack means to lift the tracks and to lower the tamping heads, command means on said carriage to provide a command signal for said control means including surveying means comprising a fixed-frequency high-intensity infra-red light beam transmitter mounted on a wheeled chassis for movement on the railroad track independently of the ballast tamping apparatus and adapted to transmit a fixed-frequency high-intensity infra-red light beam adjacent and above the track grade rail; a beam receiver mounted on the carriage for movement therewith and electrically connected with said command means; sensing means including a frame having rail engaging wheels and an adjustable shadow board, said sensing means being attached to the carriage extension adjacent the jacking means and between said transmitter and said receiver; remote-control means operable from said carriage to adjust the vertical height of the shadow board relative to its rail engaging wheels; said means to provide a command signal including electrical means to convert a light signal from said transmitter into an electrical command signal to stop the forward motion of the ballast tamping machines, operate the jack means and the tamping heads, and to continue to transmit said electrical command signal until the light signal is terminated by the interference of the lifted shadow board with the transmitted beam; and cross-level sensing means on the shadow board electrically connected with said command means operable to provide an additional command signal to cause the tamping apparatus to jack and tamp one rail more than the other until a predetermined relationship is established between the rails.

6. Apparatus as claimed in claim 5, in which the said extension on the carriage includes a floating frame pivotally supporting the jack means which comprise: a pair of hydraulic lifting jacks pivoted to said floating frame and adapted, on actuation, to pivot about said rails and engage beneath them from the outside; and, a pair of actuating jacks, pivoted to said floating frame and adapted on operation to swing said rail engaging jacks into and out of engagement with the rail.

7. Apparatus as claimed in claim 6, wherein the lifting jacks comprise hydraulic piston and cylinder arrangements, each having a rail engaging toe on its cylinders, and a ballast engaging shoe on the outer extremity of its piston rod, adapted, on operation, to drive into the ballast and to cause the rail to be lifted on said toe by reaction forces set up within the cylinder.

8. A shadow board for a railroad track surveying device comprising a frame mounted on rail engaging wheels, an upstanding cylinder located on said frame, a screw jack operable within said cylinder, a shadow board cross member universally connected to the top of said screw jack member, a shadow board at one extremity of the cross member, a pivot arm rigidly attached to said cylinder at one end and providing a pivot joint at the other end, pivotal connections between said shadow board and said pivot joint, operating means located at a point remote from said shadow board, and operative connections between said operating means and said screw jack means, whereby said screw jack may be operated to lift said cylinder and said shadow board cross member in one mode of operation, and in the second mode of operation to move said cross arm relative to said cylinder thereby to cause said shadow board to pivot about its pivot point.

9. A railroad track surveying device comprising a first carriage, motor means for said first carriage adapted to independently propel it along a railroad track, high frequency beam transmitting means on said first carriage; a tamping carriage; high frequency beam receiver means attached to said tamping carriage adapted to receive the transmited beam; motor means for said tamping carriage adapted to move it independently of said first carriage and relatively thereto; a jacking attachment for said tamping carriage including a sub frame; a track condition sensor including beam interception means on said sub frame adapted to intercept the transmitted beam between transmitter and receiver; the sub frame being in contact with the track during operation and a cross level sensing means adapted to indicate a variation in the relative height of the grade to the other rail of the track mounted on the sub frame.

10. Apparatus for surveying a railroad track comprising a fixed frequency high intensity infra red light beam transmitter adapted to be mounted on rail engaging wheels and to transmit a fixed frequency high intensity infra-red light beam adjacent and above the track grade rail; a receiver mounted on a carriage having rail engaging wheels to receive said beam; sensing means including a frame having rail engaging wheels and an adjustable shadow board, said sensing means being connected to said carriage and located adjacent said receiver between said transmitter and said receiver; means on said carriage responsive to beam interference by the shadow board to indicate a deviation in the horizontal plane of the grade rail from a desired position and cross level sensing means on said first mentioned sensing means to indicate a variation in the horizontal plane positions of the grade and other rail of the track, said cross level sensing means being mounted on the shadow board and comprising a mercury filled tube including a mercury level indicator means, a light transmitter adapted to project light through said means, a photoelectric cell adapted to receive said light beam through said indicator means and electrical means responsive to interruptions of the transmission of the light beam through said means to said photoelectric cell receiver by variations in the mercury level to indicate discrepancies in cross level of the shadow board.

References Cited in the file of this patent

UNITED STATES PATENTS

| | | |
|---|---|---|
| 1,057,001 | Lee | Mar. 25, 1913 |
| 2,268,017 | Busick et al. | Dec. 30, 1941 |
| 2,962,979 | McCormick | Dec. 6, 1960 |
| 2,974,607 | Talboys | Mar. 14, 1961 |
| 3,000,069 | Hayes | Sept. 19, 1961 |
| 3,041,982 | Plasser et al. | July 3, 1962 |

FOREIGN PATENTS

| | | |
|---|---|---|
| 753,519 | Great Britain | July 25, 1956 |